United States Patent [19]

Restaino

[11] 4,115,339

[45] * Sep. 19, 1978

[54] HIGH MOLECULAR-WEIGHT, WATER-SOLUBLE VINYL POLYMERS

[75] Inventor: Alfred J. Restaino, Wilmington, Del.

[73] Assignee: Hercules Incorporated, Wilmington, Del.

[ * ] Notice: The portion of the term of this patent subsequent to Dec. 16, 1992, has been disclaimed.

[21] Appl. No.: 602,954

[22] Filed: Aug. 7, 1975

Related U.S. Application Data

[60] Division of Ser. No. 200,195, Nov. 18, 1978, Pat. No. 3,926,756, which is a continuation of Ser. No. 781,975, Dec. 6, 1968, abandoned.

[51] Int. Cl.² .................. C08F 13/00; C08F 1/16; C08F 3/44
[52] U.S. Cl. .................. 260/29.6 HN; 204/159.22; 260/29.6 H; 260/29.6 TA; 260/29.6 B; 260/29.6 SQ; 526/303; 526/240; 526/287; 526/312; 526/328; 526/292
[58] Field of Search .............. 260/29.6 HN, 29.6 TA, 260/29.6 H, 29.6 B, 29.6 SQ, 79.3 MU; 526/303, 328; 204/159.22

[56] References Cited
U.S. PATENT DOCUMENTS

| 2,803,599 | 8/1957 | Tutwiler et al. | 204/159.22 |
| 2,940,912 | 6/1960 | McKusick | 204/159.22 |
| 3,002,960 | 10/1961 | Kolodny | 526/211 |
| 3,058,899 | 10/1962 | Yanko et al. | 204/159.22 |
| 3,081,244 | 3/1963 | Campanile | 204/159.22 |
| 3,090,736 | 5/1963 | Bashaw et al. | 204/159.22 |
| 3,255,142 | 6/1966 | Terenzi | 260/29.6 HN |
| 3,658,771 | 4/1972 | Volk et al. | 204/159.22 |
| 3,681,215 | 8/1972 | Peterson | 204/159.22 |
| 3,764,502 | 10/1973 | Restaino | 204/159.22 |

FOREIGN PATENT DOCUMENTS

| 683,476 | 3/1964 | Canada | 204/159.22 |
| 1,466,769 | 12/1966 | France. | |
| 1,492,037 | 7/1967 | France. | |
| 1,106,573 | 3/1968 | United Kingdom | 204/159.22 |

Primary Examiner—Eugene C. Rzucidlo
Attorney, Agent, or Firm—Michael B. Keehan

[57] ABSTRACT

Aqueous gels of water-soluble polymers and copolymers of extremely high molecular weight as measured by their intrinsic viscosities are prepared by the irradiation, under controlled conditions of concentration, radiation intensity, and total dose, of aqueous solutions of selected nitrogen-containing vinyl monomers separately, in admixture with each other or in admixture with non-nitrogenous vinyl monomers. The polymers may be recovered from the gels in conventional manner. The polymers and the gels are useful as flocculating and thickening agents in aqueous media.

16 Claims, No Drawings

HIGH MOLECULAR-WEIGHT, WATER-SOLUBLE VINYL POLYMERS

This is a division of application Ser. No. 200,195, filed Nov. 18, 1971, now U.S. Pat. No. 3,926,756, Dec. 15, 1977, which in turn is a continuation of application Ser. No. 781,975 filed Dec. 6, 1968 (now abandoned).

This invention related to water-soluble, nitrogen-bearing vinyl polymers and copolymers of extremely high mmolecular weight as measured by their intrinsic viscosities, to aqueous gels of such polymers, and to a method for their preparation.

The prior art reveals a number of methods for preparing water-soluble vinyl polymers of high molecular weight. For example, vinyl monomers have been polymerized in solution, in emulsion, and in suspension employing chemical catalysts, usually peroxides, to initiate polymerization. Solution polymerization via chemical catalysts; e.g., potassium peroxy disulfate, is not practical because the polymerization cannot be carried out to high conversion and very high molecular weights at practical concentrations of monomer in solution. In suspension or emulsion polymerization, the chemical catalyst is added to a mixture of organic solvent, water, vinyl monomer, suspending or emulsifying agents, and, optionally, a polymer precipitant. By these techniques, it is possible to obtain high conversion of monomer to polymer and products of high molecular weight. However, the polymer must be separated from excess quantities of solvents and additives in order to obtain the product in useful form. Moreover, chemically catalyzed polymerizations require careful control of polymerization temperature to avoid decreases in molecular weight or premature cross-linking and insolubilization of the polymer. In order to achieve practical levels of conversion, molecular weight, and water-solubility, the rate of such polymerizations must generally be controlled to require reaction periods of several hours, usually from several hours to several days.

The intrinsic viscosities of polymers so-prepared may range from about 2 to about 9 dl/g., more usually from 4 to 7 dl/g, in 2N sodium chloride solution.

In recent years attention has been focused on the polymerization of vinyl monomers under the influence of high energy ionizing radiation. For example, acrylamide has been polymerized by irradiation at medium to high intensities and doses to yield polymers having intrinsic viscosities generally lower than those obtained by conventional chemically catalyzed polymerizations. Polymerization of acrylamide by irradiation in the solid state has yielded polymers having intrinsic viscosities of less than 2 dl/g.

In accordance with the present invention, it has been found that aqueous gels of water-soluble polymers and copolymers of extremely high molecular weight are obtained when water-soluble, nitrogen-bearing vinyl monomers, or mixtures comprising such monomers, in aqueous solution are subjected to radiation-induced polymerization under controlled conditions of monomer concentration, radiation intensity, and radiation dose as more fully set forth hereinafter. From the gels so formed, the polymers may be recovered as solids by conventional manner.

Unusually low radiation dose, in comparison with other radiation induced reactions, are employed and the process is very efficient. G-values for conversion of monomer to polymer from 200,000 to more than 1,000,000 are characteristic. The process of the invention has further advantages in that the reaction is rapid, usually being complete within an hour; it requires no temperature control; and there are no organic solvents or additives to be recovered. The extremely high molecular weight of the obtained polymers is evidenced by their high intrinsic viscosities which range upwards from 6 dl/g., and generally fall in the range of from 10 to 30 dl/g., as measured in 2N sodium chloride solution. When the intrinsic viscosity of vinyl monomers is measured in water without the presence of salt, values obtained are much higher.

Because of their very high molecular weights and water-solubility, the polymers and copolymers of the invention are especially useful as thickening agents and flocculants where they generally function at very low concentrations. They show particular advantages, for example, in sewage treatment to thicken, dewater, and remove phosphorus compounds therefrom; in mineral processing to flocculate slimes and slurries; and in paper manufacture to retain pigment, improve strength, or alter the conductivity.

The polymers and copolymers of the invention are prepared from water-soluble monomers conforming to the formula

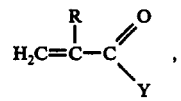

mixtures of such monomers or water-soluble mixtures of such monomers with other vinyl monomers. In the formula R represents hydrogen or methyl and —Y represents —NH$_2$, or

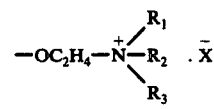

wherein R$_1$, R$_2$, and R$_3$ are 1 to 4 carbon alkyl radicals and X is an anion. Among the monomers conforming to the formulas are acrylamide, methacrylamide, dimethyl aminoethyl methacrylate quaternized with dimethyl sulfate, diethyl aminoethyl acrylate quaternized with methyl chloride, dimethyl aminoethyl acrylate quaternized with dimethyl sulfate, and the like. Preferred nitrogen-bearing monomers for use in the invention are acrylamide, dimethyl aminoethyl acrylate quaternized with dimethyl sulfate, and dimethyl amino methacrylate quaternized with dimethyl sulfate. The invention also contemplates copolymers and terpolymers obtained by polymerizing mixtures of monomers conforming to the foregoing formula as well as water-soluble mixtures of such monomers with acrylonitrile, acrylic acid, vinyl sulfonic acid or water-soluble salts of either of the latter. By selection of monomer combinations, polymers may be obtained which are nonionic, cationic, anionic, or ampholytic as desired. By way of illustration, acrylamide yields an essentially nonionic polymer, copolymers of acrylamide with acrylic acid or with quaternized dimethyl aminoethyl methacrylate are anionic or cationic, respectively, while terpolymers of acrylamide with both acrylic acid and the quaternary compound are ampholytic. Acrylonitrile is, by itself, relatively insoluble in water; but mixtures thereof with the water-soluble vinyl monomers above-characterized containing up to 25% acrylonitrile are soluble and may be employed. When monomer mixtures are polymerized in accordance with the invention, the said mixtures contain at least 15% by weight of one or more monomers according to the aforesaid formula. In order to obtain the high molecular-weight, water-soluble polymers and copolymers of the invention in gel form, the polymerization is carried out in aqueous solutions containing from about 10% to about 45%, and preferably from about 15% to about 35%, by weight of dissolved monomer. At lower values of monomer concentration, the tendency is to the production of polymer solutions rather than the desired gel form, whereas at higher concentrations, there is a tendency to the production of undue amounts of insoluble product. The particular limits of concentrations will vary somewhat with the particular monomers being treated but in general values within the ranges stated are satisfactory.

The polymerization is effected, in accordance with the invention, by subjecting an aqueous solution of a monomer or mixture of monomers to high energy ionizing radiation. The radiation employed may be particulate or electromagnetic in nature, and includes accelerated electrons, protons, neutrons, etc., as well as X-rays and gamma rays. The solution is irradiated to a total dose of from 1,000 to 200,000 rads. In many cases, it is preferred to work at radiation doses of from 5,000 to 30,000 rads. The dose should be that sufficient to produce the desired water-soluble gel form but not enough to produce substantial amounts of insoluble product.

The intensity of radiation has a significant effect on the molecular weight of the product obtained and consequently on the viscosity of its solutions. In general, the higher molecular weights are obtained at the lower intensities of radiation. On the other hand, the degree of conversion which can be obtained before an undue degree of insolubilization takes place is greater at higher intensities of radiation. In view of these considerations, it is usually desirable to employ radiation intensities of at least 250 rads per hour and preferably of at least 5,000 rads per hour. Conversion from about 80 to 100% of the monomer treated can be obtained without undue insolubilization. On the other hand, desirable high molecular weight water soluble polymers may be obtained with radiation intensities as high as one megarad per hour, but to obtain significantly higher molecular weight polymers of the invention, values below about 200,000 rads per hour are desirable and for producing polymers having molecular weights in the highest range, it is preferred that values below about 100,000 rads per hour be employed.

The radiation reaction of the present invention is relatively insensitive to pH over a rather wide range. It is preferable to avoid the use of very low pH values because some production of undesirable insoluble polymers tends to take place if the pH is unduly lowered, particularly with acrylamide based products. On the other hand, very high pH values may result in some hydrolysis and modification of the monomer being reacted, this again being particularly true of acrylamide. Although the particular range will depend to some degree on the particular monomer composition being treated, it may be stated in general that pH values of about 3 to about 13 are usually satisfactory.

As indicated, the aqueous solutions of monomer are converted to stiff, rubbery aqueous gels of water-soluble polymer. The gels may be utilized directly as thickening agents or flocculants by further dilution with water to form stock solutions for treatment of the dispersions or sludges to be processed. Alternatively, the polymers may be recovered in particulate form of lowered water content by conventional means such, for example, as by finely subdividing the gel and drying or by leaching water from the finely subdivided gel with a water-immiscible, volatile organic liquid which is a non-solvent for the polymer and evaporating the solvent from residual polymer particles.

The water-soluble gel form of the products of the present invention is of particular advantage because it permits ready dissolution in water without extensive vigorous agitation. Dry forms of nitrogen containing vinyl polymers of the type previously available have required very vigorous and lengthy stirring techniques frequently resulting in breakdown of the polymer from shear stress.

It is within the scope of this invention to include non-polymerizing additives in minor amounts to the monomer solution prior to polymerization or to the gel formed after polymerization. While additives of this type may be removable from the polymer, it is frequently preferred to leave them in because of the benefits they produce in the final product. For example, products such as urea and ferric chloride or other inorganic salts may be added to the monomer prior to polymerization to provide easier processing of the gel product.

The high molecular-weight polymers of the invention, like other high molecular weight vinyl polymers, are quite sensitive to degradation by shearing forces, especially when solvated. It is, accordingly, advisable in preparing solutions, for intrinsic viscosity measurement or as stock solutions for use in flocculation, to avoid high shearing forces. The solutions used for determining intrinsic viscosities reported herein were prepared by first soaking the polymer or its gel in water overnight and then adding sufficient NaCl to produce a 2N solution thereof and rolling on a roller bar at 9 r.p.m. for about an hour. Alternatively, the polymer may be added to the solvent in a suitable container and rolled at low speed from 1 to 2 days.

The invention will be better understood from a consideration of the following examples which are presented for illustrative purposes and are not to be considered as defining or limiting the scope of the invention:

EXAMPLE I

Preparation of Polyacrylamide

The pH of an aqueous solution of acrylamide containing 20% by weight of dissolved monomer was adjusted to 12.0 with 50% aqueous sodium hydroxide solution. The solution was poured into a polyethylene bag, flushed with high purity nitrogen, and irradiated to a total dose of 4,350 rads with gamma rays from a Co-60 source at an intensity of 8,700 rads per hour. The conversion of monomer to polymer was 91.7% complete, and the product was a transparent rubbery gel. The gel was completely soluble in water. It was evaluated in comparison with commercially available polyacrylamides as a flocculant for a suspension of colloidal kaolin clay in water containing 0.76% by weight of suspended solids. Stock solutions of the flocculants containing 0.025% dissolved polymer were added incrementally to suspensions of the clay in graduated cylinders with agitation after each addition and the minimum concentrations of flocculant necessary to settle the clay leaving a clear supernate were noted. The results are reported as parts per million of polymer in the suspension necessary to produce a clear supernate above the settling solids.

| Polymer | Flocculating Concentration | Intrinsic Viscosity* |
|---|---|---|
| Product of Ex. 1 | 1.0 ppm | 21.8 dl/g. |
| Commercial Polyacrylamide-A | 16 ppm | 6.8 dl/g. |
| Commercial Polyacrylamide-B | 12 ppm | 8.5 dl/g. |

*Intrinsic viscosity of the polymer measured in 2N NaCl solution at 25.5° C.

It is obvious that the polymer prepared in accordance with the invention is from 3 to 4 times as efficient as the presently available flocculants.

EXAMPLE II

Preparation of Polyacrylamide

The process of Example I was repeated except that the solution concentration was 30%, the radiation intensity was 30,000 rads per hour, and the total dose was 12,500 rads. The conversion of monomer to polymer was 99%. The intrinsic viscosity of the product was 14.4 dl/g. in 2N sodium chloride solution. A portion of the formed gel was cut into small pieces and dried at 120° C. to a solids content of 50 – 60%. A free flowing granular solid, completely soluble in water was obtained. It was subjected to the flocculation test described in Example I with the result that a concentration of 7 ppm flocculant sufficed to produce a clear supernate above the settling kaolin solids.

EXAMPLE III

Preparation of Acrylamide-Sodium Acrylate Copolymer

A monomer solution containing 25% dissolved monomer comprising 25% sodium acrylate and 75% acrylamide was prepared as follows: 125 grams of glacial acrylic acid were dissolved in 755 grams of distilled water and made alkaline by the addition of 69 grams of sodium hydroxide with cooling. 500 grams of acrylamide dissolved in 1200 grams of distilled water were added with stirring. The final weight of the solution was 2,649 grams. The pH of the resulting solution was 9.4. It was poured into a polyethylene bag, flushed with high purity nitrogen, and sealed. The bag and its contents were irradiated with Co-60 gamma rays at an intensity of 20,000 rads per hour for 24 minutes to a total dose of 8,000 rads, at which point the contents had become a rubbery gel. The monomer was completely converted to polymer as determined by polymer precipitation. The intrinsic viscosity of the polymer, determined in 2N sodium chloride solution at 25° C., was 23 dl/g.

It was evaluated as a flocculating agent for solids in phosphate slime obtained in the commercial processing of a Florida phosphate mineral, in comparison with two commercially available vinyl polymers recommended for the purpose by their suppliers. Stock solutions of the test polymers containing 0.025% solids were prepared and added to the slime slurries, in graduated cylinders, adjusted to a suspended solids content of 1% by weight in quantities sufficient to furnish 0.5 lbs. polymer per ton of dry slime. The settling rates of the flocculating solids were observed and expressed in feet per hour. The results were as follows:

| Polymer | Settling Rate ft./hr. |
|---|---|
| Product of Example III | >138* |
| Commercial Product A | 55.6 |
| Commercial Product B | 33.6 |

*Too fast to measure precisely

EXAMPLE IV

Preparation of 1:1 Acrylamide-DMAEMQ Copolymer 50 ml. portions of 29.44 weight percent aqueous solution of acrylamide and dimethyl sulfate quaternized dimethyl aminoethyl methacrylate, respectively, were mixed and charged into a polyethylene bag, flushed with purified nitrogen, and sealed.

The bag and its contents were irradiated with gamma rays from a Co-60 source for 1 hour at an intensity of 19,000 rads per hour to yield a solid gel in which all of the monomer had been converted to polymer. On dilution with more water, no insoluble polymer precipitated.

The product was evaluated as a filter aid for primary digested sewage sludge in comparison with a commercially available aid recommended by its supplier for the same purpose. The specific resistances to filtration of treated sludges were determined according to the method described by Coackley in *Biological Treatment of Sewage and Industrial Wastes,* Reinhold Publishing Co., 1958, at pp. 275-278. The filterability of a suspension is inversely proportional to the specific resistance so-determined. The sludge, containing 4.6% by weight of dry solids before filtration, was treated with 2.5 lbs./ton of dry solids of the polymer under test and filtered at 14.5 inches of mercury pressure. The specific filtration resistances obtained for the product of Example IV and the commercial flocculant were $0.148 \times 10^9$ sec$^2$/g. and $0.253 \times 10^9$ sec$^2$/g., respectively. The superiority of the product of the invention is manifest by the nearly two-fold increase in filterability of the sludge.

EXAMPLE V

Preparation of 3:1 Acrylamide-DMAEMQ Copolymer

The pH of a solution containing 20% by weight of a monomer mixture comprising 75% of acrylamide and 25% of dimethyl sulfate quaternized dimethyl aminoethyl methacrylate by weight was adjusted to 7.0 by the addition of sodium hydroxide. The solution was introduced into a polyethylene bag, flushed with high purity nitrogen, and sealed. The bag and its contents were irradiated with gamma rays from a Co-60 source at an intensity of 20,000 rads/hour for 30 minutes. The solution was transformed into a rubbery aqueous gel of high molecular-weight copolymer, the conversion of monomer to polymer being in excess of 95%. The copolymer was completely soluble in water at high dilution, and it exhibited an intrinsic viscosity of 10 dl/g. in 2N sodium chloride solution.

The polymer was evaluated as a filter aid for digested primary and secondary sewage sludge in comparison with a commercially available aid recommended by its supplier for the same purpose by comparing the specific resistances to filtration of sludges treated therewith as described in Example IV. Portions of the sludge, containing 2.6% solids by weight, and having a specific resistance to filtration of $5.75 \times 10^9$ sec.$^2$/g., were treated at two dose levels with the filtration aids under comparison and filtered at 14.5 inches of mercury pressure. The results obtained were as follows:

| Dose - Lbs./Ton | Specific Resistance, Sec.$^2$/g. | |
| --- | --- | --- |
| Dry Solids | Prod. of Ex. V | Commercial Prod. |
| 0.75 | $2.0 \times 10^9$ | $3.2 \times 10^9$ |
| 1.35 | $0.3 \times 10^9$ | $2.0 \times 10^9$ |

That the product of the invention was very much superior to that of the commercially available product is evident from the figures in the table.

EXAMPLE VI

Preparation of Sodium Acrylate: DMAEMQ:Acrylamide Terpolymer

An aqueous solution containing 22.5 grams acrylamide, 22.75 grams acrylic acid, 12.5 grams sodium hydroxide, and 22.5 grams dimethyl sulfate quaternized dimethyl aminoethyl methacrylate in 134.0 grams of distilled water, having a pH of 7.1, was introduced into a polyethylene bag, flushed with high purity nitrogen, and sealed. The bag and its contents were subjected to gamma rays from a Co-60 source at an intensity of 20,000 rads per hour to a total dose of 13,400 rads. The conversion of monomer to polymer was approximately 90% to form an aqueous gel of the terpolymer. The gel was completely soluble in water, forming a very viscous solution in the proportion of one gram of gel to 100 ml water. The product was useful in treatment of raw sewage.

EXAMPLE VII

Preparation of Acrylamide-Acrylonitrile Copolymer

A solution containing 22.5 grams acrylamide and 7.5 grams acrylonitrile in water was charged into polyethylene bag, flushed with high purity nitrogen, and sealed. The bag and contents were irradiated with gamma rays from a Co-60 source at an intensity of 25,000 rads per hour to a total dose of 16,700 rad. Conversion of monomer to polymer was approximately 70%, changing the solution in the bag to a rubbery gel. Upon dilution with water, all of the polymer went into solution.

EXAMPLE VIII

Preparation of Acrylamide-Acrylic Acid-Acrylonitrile Terpolymer

A solution containing 36 grams acrylamide, 2 grams of acrylonitrile, and 2 grams of acrylic acid in 120 grams of water was neutralized to a pH of 8.1 with 5N sodium hydroxide solution. The solution was irradiated as in the preceding examples at an intensity of 10,000 rads per hour to a total dose of 5,000 rads to form a water-soluble gel of a terpolymer of the named monomers.

EXAMPLE IX

Preparation of Acrylamide — Sodium Vinyl Sulfonate Copolymer

A solution containing 75 grams of acrylamide, 100 grams of 25% aqueous solution of sodium vinyl sulfonate and 125 grams of water was brought to a pH of 11.2 with 0.65 ml. of 5N sodium hydroxide. The solution, which had a monomer concentration of 33-⅓%, was irradiated as in the preceding examples at an intensity of 20,000 rads per hour to a total dose of 11,700 rads. The monomer was completely polymerized, and the product was a rubbery gel which was completely soluble in water. Its intrinsic viscosity in 2N sodium chloride solution was 7.2 at 25° C.

EXAMPLE X

Preparation of Acrylamide - DMAEAQ Copolymer

A monomer solution was prepared as follows: 21 grams of acrylamide were added to 25 ml. of an aqueous solution containing 7.4 grams of dimethyl sulfate quaternized dimethyl-pH was adjusted to 8.0 by addition of 1N.NaOH solution. The solution was poured into a polyethylene bag, flushed with high purity nitrogen and sealed. The bag and its contents were irradiated to 6,330 rads with gamma rays from a Co-60 source at an intensity of 20,000 rads/hour at which time the contents became a rubbery gel. The conversion was about 90%. The contents were soluble upon dilution with water. The intrinsic viscosity of the polymer as determined in 2N NaCl solution was found to be 14.0 dl/g. The product was evaluated, as a filter aid for digested sewage sludge, in comparison with a commercially available aid recommended by its supplier for the same purpose. The method is described in Example IV. Portions of the sludge containing 6.1% solids by weight were treated with both filter aids under comparison at 8.0 pounds/ton of dry solids and filtered at 14.5 inches of mercury pressure. The product of this invention gave a specific resistance value of $0.60 \times 10^8$ sec$^2$/g. while the prior art product gave a value of $6.0 \times 10^8$ sec$^2$/g. This exemplifies the superiority of the product of this invention over the prior art.

The polymers and copolymers of the invention may, if desired, be modified by incorporating in the monomer solutions, during polymerization, minor proportions of non-polymerizable components. For example, the rate of solutions of the polymer may be increased markedly without inhibiting the flocculating value thereof by incorporating up to 20% by weight of a water-soluble polymer of ethylene oxide having an average molecular weight of 20,000. Such modified polymers are to be considered as coming within the scope of the invention.

What is claimed is:

1. A water-soluble copolymer having an intrinsic viscosity in 2N sodium chloride solution of from about 6 deciliters per gram to about 30 deciliters per gram at 25° C., said copolymer being prepared by a process comprising (a) irradiating with high energy ionizing radiation at an intensity of from 250 rads to 200,000 rads per hour to a dose of from 1,000 to 200,000 rads, an ammonia free aqueous solution having a pH from about 3 to about 13 and containing from 10% to 45% concentration by weight of (1) at least two monomers conforming to the formula

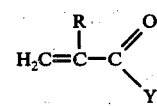

(2) a mixture of at least one of said monomers with at least one of acrylic acid, vinyl sulfonic acid, water-soluble salt of acrylic acid, or water-soluble salt of vinyl sulfonic acid, said mixture containing at least 15% by weight of said monomer; (3) a mixture of at least one of said monomers with up to 25% of its own weight of acrylonitrile; or (4) a mixture of at least one of said monomers, acrylic acid, or a water-soluble salt thereof, and acrylonitrile containing at least 15% by weight of said monomer and no more than 25% by weight of acrylonitrile, wherein Y is —NH₂ or

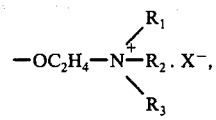

wherein R is hydrogen or methyl, R₁, R₂, and R₃ are 1 to 4 carbon alkyl radicals and X⁻ is an anion, to form an aqueous gel of a water-soluble, high molecular weight copolymer having an intrinsic viscosity of from about 6 deciliters per gram to about 30 deciliters per gram in 2 normal sodium chloride solutions at 25.5° C., and (b) recovering said copolymer from the aqueous copolymer gel.

2. A copolymer of claim 1 wherein the monomers are a mixture of acrylamide and sodium acrylate.

3. A copolymer of claim 1 wherein the monomers are a mixture of acrylamide and the dimethylsulfate quaternary of dimethylaminoethyl methacrylate.

4. A copolymer of claim 1 wherein the monomers are a mixture of acrylamide, sodium acrylate, and the dimethylsulfate quaternary of dimethylaminoethyl methacrylate.

5. A copolymer of claim 1 wherein the monomers are a mixture of acrylamide and the methyl chloride quaternary of dimethylaminoethyl methacrylate.

6. A copolymer of claim 1 wherein the monomers are a mixture of acrylamide and the methyl chloride quaternary of dimethylaminoethyl acrylate.

7. A copolymer of claim 1 wherein the monomers are a mixture of acrylamide and the dimethylsulfate quaternary of dimethylaminoethyl acrylate.

8. An aqueous gel containing from about 10% to about 45% by weight concentration, of a water-soluble copolymer, having an intrinsic viscosity in 2N sodium chloride solution of from about 6 deciliters per gram to about 30 deciliters per gram at 25° C., said aqueous copolymer gel being prepared by a process comprising irradiating with high energy ionizing radiation at an intensity of from 250 rads to 200,000 rads per hour to a dose of from 1,000 to 200,000 rads, an ammonia free aqueous solution having a pH from about 3 to about 13 and containing from 10% to 45% concentration by weight of (1) at least two monomers conforming to the formula

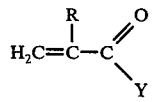

(2) a mixture of at least one of said monomers with at least one of acrylic acid, vinyl sulfonic acid, water-soluble salt of acrylic acid, or water-soluble salt of vinyl sulfonic acid, said mixture containing at least 15% by weight of said monomer; (3) a mixture of at least one of said monomers with up to 25% of its own weight of acrylonitrile; or (4) a mixture of at least one of said monomers, acrylic acid, or a water-soluble salt thereof, and acrylonitrile containing at least 15% by weight of said monomer and no more than 25% by weight of acrylonitrile, wherein y is —NH₂ or

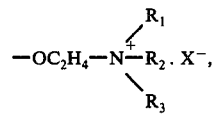

wherein R is hydrogen or methyl, R₁, R₂, and R₃ are 1 to 4 carbon alkyl radicals and X⁻ is an anion, to form an aqueous gel containing a water-soluble, high molecular weight copolymer having an intrinsic viscosity of from about 6 deciliters per gram to about 30 deciliters per gram in 2 normal sodium chloride solution at 25.5° C.

9. An aqueous gel of claim 8 wherein the monomers are a mixture of acrylamide and sodium acrylate.

10. An aqueous gel of claim 8 wherein the monomers are a mixture of acrylamide and the dimethylsulfate quaternary of dimethylaminoethyl acrylate.

11. An aqueous gel of claim 8 wherein the monomers are a mixture of acrylamide and the methyl chloride quaternary of dimethylaminoethyl acrylate.

12. An aqueous gel of claim 8 wherein the monomers are a mixture of acrylamide and the dimethylsulfate quaternary of dimethylaminoethyl methacrylate.

13. An aqueous gel of claim 8 wherein the monomers are a mixture of acrylamide, sodium acrylate and the dimethylsulfate quaternary of dimethylaminoethyl methacrylate.

14. An aqueous gel of claim 8 wherein the monomers are a mixture of acrylamide and the methyl chloride quaternary of dimethylaminoethyl methacrylate.

15. A water-soluble copolymer having an intrinsic viscosity in 2N sodium chloride solution of from about 6 deciliters per gram to about 30 deciliters per gram at 25° C., said copolymer being prepared by a process consisting essentially of (a) irradiating with high energy ionizing radiation at an intensity of from 250 rads to 200,000 rads per hour to a dose of from 1,000 to 200,000 rads, an ammonia free aqueous solution having a pH from about 3 to about 13 and containing from 10% to 45% concentration by weight of (1) at least two monomers conforming to the formula

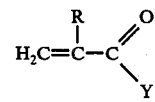

(2) a mixture of at least one of said monomers with at least one of acrylic acid, vinyl sulfonic acid, water-soluble salt of acrylic acid, or water-soluble salt of vinyl sulfonic acid, said mixture containing at least 15% by weight of said monomer;(3) a mixture of at least one of said monomers with up to 25% of its own weight of acrylonitrile; or (4) a mixture of at least one of said monomers, acrylic acid, or a water-soluble salt thereof, and acrylonitrile containing at least 15% by weight of said monomer and no more than 25% by weight of acrylonitrile, wherein Y is —NH₂ or

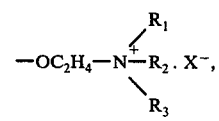

wherein R is hydrogen or methyl, R₁, R₂, and R₃ are 1 to 4 carbon alkyl radicals and X⁻is an anion, to form an aqueous gel of a water-soluble, high molecular weight copolymer having an intrinsic viscosity of from about 6 deciliters per gram to about 30 deciliters per gram in 2 normal sodium chloride solutions at 25.5° C., and (b) recovering said copolymer from the aqueous copolymer gel.

16. An aqueous gel containing from about 10% to about 45% by weight concentration, of a water-soluble copolymer, having an intrinsic viscosity in 2N sodium chloride solution of from about 6 deciliters per gram to about 30 deciliters per gram at 25° C., said aqueous copolymer gel being prepared by a process consisting essentially of irradiating with high energy ionizing radiation at an intensity of from 250 rads to 200,000 rads per hour to a dose of from 1,000 to 200,000 rads, an ammonia free aqueous solution having a pH from about 3 to about 13 and containing from 10% to 45% concentration by weight of (1) at least two monomers conforming to the formula

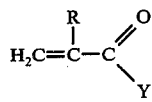

(2) a mixture of at least one of said monomers with at least one of acrylic acid, vinyl sulfonic acid, water-soluble salt of acrylic acid, or water-soluble salt of vinyl sulfonic acid, said mixture containing at least 15% by weight of said monomer; (3) a mixture of at least one of said monomers with up to 25% of its own weight of acrylonitrile; or (4) a mixture of at least one of said monomers, acrylic acid, or a water-soluble salt thereof, and acrylonitrile containing at least 15% by weight of said monomer and no more than 25% by weight of acrylonitrile, where Y is $-NH_2$ or

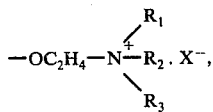

wherein R is hydrogen or methyl, $R_1$, $R_2$, and $R_3$ are 1 to 4 carbon alkyl radicals and $X^-$ is an anion, to form an aqueous gel containing a water-soluble, high molecular weight copolymer having an intrinsic viscosity of from about 6 deciliters per gram to about 30 deciliters per gram in 2 normal sodium chloride solution at 25.5° C.

* * * * *

UNITED STATES PATENT AND TRADEMARK OFFICE
CERTIFICATE OF CORRECTION

PATENT NO. : 4,115,339
DATED : September 19, 1978
INVENTOR(S) : Alfred J. Restaino It is certified that error appears in the above–identified patent and that said Letters Patent are hereby corrected as shown below:

Col. 1, line 8,                      "related" should read
--relates--.

Col. 1, line 10,                  "mmolecular" should read
--molecular--.

Col. 5, line 8,                     "1.0 ppm" should read
--4.0 ppm--.

Col. 7, line 40,                    "rad" should read
--rads--.

Signed and Sealed this

Nineteenth Day of December 1978

[SEAL]

Attest:

RUTH C. MASON
*Attesting Officer*

DONALD W. BANNER
*Commissioner of Patents and Trademarks*